(12) United States Patent
Paulsen et al.

(10) Patent No.: US 8,303,855 B2
(45) Date of Patent: Nov. 6, 2012

(54) DOPED LITHIUM TRANSITION METAL OXIDES CONTAINING SULFUR

(75) Inventors: Jens Martin Paulsen, Cheonan (KR); Thomas Lau, Edmonton (CA)

(73) Assignee: Umicore, Brussels (BE)

( * ) Notice: Subject to any disclaimer, the term of this patent is extended or adjusted under 35 U.S.C. 154(b) by 282 days.

(21) Appl. No.: 12/672,172

(22) PCT Filed: Aug. 4, 2008

(86) PCT No.: PCT/EP2008/006409
§ 371 (c)(1),
(2), (4) Date: May 4, 2010

(87) PCT Pub. No.: WO2009/021651
PCT Pub. Date: Feb. 19, 2009

(65) Prior Publication Data
US 2011/0260099 A1  Oct. 27, 2011

Related U.S. Application Data

(60) Provisional application No. 60/935,394, filed on Aug. 10, 2007.

(51) Int. Cl.
*H01B 1/08* (2006.01)

(52) U.S. Cl. ............... 252/519.4; 252/521.2; 423/179.5; 429/218.1

(58) Field of Classification Search ............... 252/518.1, 252/519.4, 520.5, 521.2; 429/523, 218.1, 429/223, 231.95; 423/179.5, 518
See application file for complete search history.

(56) References Cited

U.S. PATENT DOCUMENTS
4,302,518 A   11/1981  Goodenough et al.
(Continued)

FOREIGN PATENT DOCUMENTS
EP   0849817   6/1998
(Continued)

OTHER PUBLICATIONS

Noguchi et al., "Preparation of Layered Li-Ni-Mn-O Compounds and its Electrochemical Property," International Symposium on Fuel Cells for Vehicles, Abstract 1D08, (1998), pp. 388-389.
(Continued)

*Primary Examiner* — Mark Kopec
(74) *Attorney, Agent, or Firm* — Brinks Hofer Gilson & Lione

(57) ABSTRACT

The invention covers a powderous lithium transition metal oxide having a layered crystal structure $Li_{1+a}M_{1-a}O_{2+b}M'_k Sm$ with $-0.03<a<0.06$, $b\cong 0$, M being a transition metal compound, consisting of at least 95% of either one or more elements of the group Ni, Mn, Co and Ti; M' being present on the surface of the powderous oxide, and consisting of either one or more elements from (IUPAC) of the Periodic Table, each of said Group 2, 3, or 4 elements having an ionic radius between 0.7 and 1.2 Angstrom, M' however not comprising Ti, with $0.015<k<0.15$, k being expressed in wt %, and $0.15<m\leq 0.6$, m being expressed in mol %. The addition M' (like Y, Sr, Ca, Zr, ...) improves the performance as cathode in rechargeable lithium batteries. In a preferred embodiment a content of 250-400 ppm calcium and 0.2-0.6 mol % of sulfur is used. Particularly, a significantly lower content of soluble base and a dramatically reduced content of fine particles are achieved. Especially preferred performance is achieved if 11.5-13.5% of the metal atoms of the cathodes are divalent nickel.

14 Claims, 6 Drawing Sheets

U.S. PATENT DOCUMENTS

Figure 1:
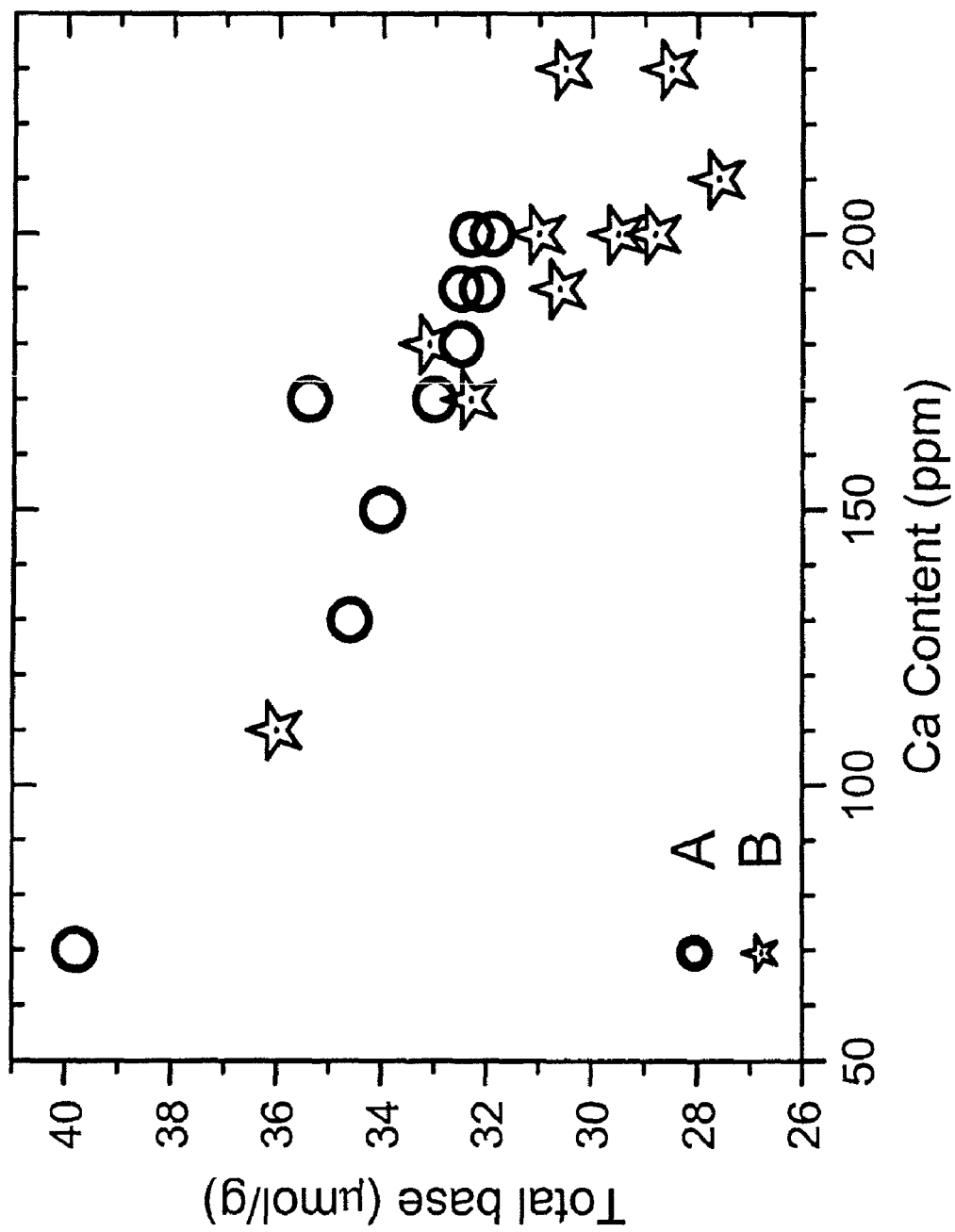

| | | | |
|---|---|---|---|
| 4,357,215 A | 11/1982 | Goodenough et al. | |
| 5,672,445 A | 9/1997 | Nakamitsu et al. | |
| 5,718,989 A | 2/1998 | Aoki et al. | |
| 5,795,558 A | 8/1998 | Aoki et al. | |
| 6,040,087 A * | 3/2000 | Kawakami | 429/218.1 |
| 6,040,090 A | 3/2000 | Sunagawa et al. | |
| 6,368,750 B1 | 4/2002 | Nemoto et al. | |
| 6,372,385 B1 | 4/2002 | Kweon et al. | |
| 6,660,432 B2 | 12/2003 | Paulsen et al. | |
| 6,677,082 B2 | 1/2004 | Thackeray et al. | |
| 6,680,143 B2 | 1/2004 | Thackeray et al. | |
| 6,749,965 B1 | 6/2004 | Kweon et al. | |
| 6,783,890 B2 | 8/2004 | Kweon et al. | |
| 6,964,828 B2 | 11/2005 | Lu et al. | |
| 7,078,128 B2 | 7/2006 | Lu et al. | |
| 7,135,252 B2 | 11/2006 | Thackeray et al. | |
| 7,457,018 B2 * | 11/2008 | Armand et al. | 359/32 |
| 2002/0142221 A1 | 10/2002 | Nemoto et al. | |
| 2002/0192552 A1 | 12/2002 | Lampe-Onnerud et al. | |
| 2003/0027048 A1 | 2/2003 | Lu et al. | |
| 2005/0118505 A1 | 6/2005 | Nemoto et al. | |
| 2006/0105239 A1 | 5/2006 | Paulsen et al. | |
| 2007/0122705 A1 | 5/2007 | Paulsen et al. | |

FOREIGN PATENT DOCUMENTS

| | | |
|---|---|---|
| EP | 1321994 | 6/2003 |
| EP | 1450423 | 8/2004 |
| JP | 05242891 | 9/1993 |
| JP | 8222223 | 8/1996 |
| JP | 09171824 | 6/1997 |
| JP | 09237631 | 9/1997 |
| JP | 10162830 | 6/1998 |
| JP | 10188982 | 7/1998 |
| JP | 11025957 | 1/1999 |
| JP | 11307094 | 11/1999 |
| JP | 11307097 | 11/1999 |
| JP | 2000128539 | 5/2000 |
| JP | 2000200607 | 7/2000 |
| JP | 2000223122 | 8/2000 |
| JP | 2002151154 | 5/2002 |
| JP | 2004-263255 * | 9/2004 |
| KR | 20010002784 | 1/2001 |
| WO | WO 2005/064715 | 7/2005 |
| WO | WO 2006/027925 | 3/2006 |

OTHER PUBLICATIONS

International Search Report and Written Opinion, issued in PCT/EP2008/006409, dated Jan. 16, 2009.

International Preliminary Report on Patentability, issued in PCT/EP2008/006409, dated Oct. 8, 2009.

Numata et al., "Synthesis and Characterization of Layer Structured Solid Solutions in the System of $LiCoO_2$-$Li_2MnO_3$," Solid State Ionics, vol. 117, (1999), pp. 257-263.

Rossen et al., "Structure and Electrochemistry of $Li_xMn_yNi_{1-y}O_2$," Solid State Ionics, vol. 57, (1992), pp. 311-318.

* cited by examiner

DOPED LITHIUM TRANSITION METAL OXIDES CONTAINING SULFUR

This application is a National Stage application of International Application No. PCT/EP2008/006409, filed Aug. 4, 2008, which claims the benefit of U.S. Provisional Application No. 60/935,394, filed Aug. 10, 2007, the entire contents of which is hereby incorporated herein by reference.

The invention relates to a powderous lithium transition metal oxide, used as active cathode material in rechargeable lithium batteries. More particularly, in $Li(Mn-Ni-Co)O_2$ type compounds containing sulfur the addition of certain amounts of elements like Ca, La, Y, Sr, Ce or Zr optimizes the electrochemical and safety characteristics of the cathode material.

$LiCoO_2$ is the most widely applied cathode material for rechargeable batteries. However, there exists a strong pressure to replace it by other materials for particular reasons. Currently, scarce resources of cobalt and fear of high prices accelerate this trend. Besides $LiFePO_4$ and Li—Mn-spinel, which both suffer from much lower energy density, $LiNiO_2$ based layered cathode materials and $Li(Mn-Ni-Co)O_2$ based layered cathode materials are the most likely candidates to replace $LiCoO_2$ in commercial battery applications. Today it is basically known that any composition $Li[Li_x M_{1-x}]O_2$ with M=Mn, Ni, Co within the quaternary system $Li[Li_{1/3}Mn_{2/3}]O_2$—$LiCoO_2$—$LiNiO_2$—$LiNi_{0.5}Mn_{0.5}O_2$ exists as a layered phase, and in most cases is electrochemically active.

Even this quarternary system is to be seen as a simplified model because it does not take into account further phenomena like the possibility of cation mixing. One type of cation mixing is known from $LiNiO_2$ where some nickel is misplaced on lithium sites of the r-3m layered crystal structure, a more realistic formula is approximated as $\{Li_{1-x}Ni_x\}[Ni]O_2$. It is also known that $Li_{1+x}M_{1-x}O_2$ with M=$Mn_{1/3}Ni_{1/3}Co_{1/3}$ is better written as $\{Li_{1+y}M_y\}[Li_zM_{1-z}]O_2$.

As a result, layered $Li(Mn-Ni-Co)O_2$ phases which are of interest for battery cathode materials belong to the quarternary (according Gibbs phases rule) subspace of the 5 dimensional thermodynamic system $LiNiO_2$—$\{Li_{1-a}Ni_a\}NiO_2$—$Li[Li_{1/3}Mn_{2/3}]O_2$—$LiCoO_2$—$LiNiO_2$. Most of the phases within this triangle are electrochemically active.

By very basic thermodynamic reasons, if further parameters are included (like oxygen particle pressure or temperature) the numbers of dimensions might increase further to 5 or 6, to explain phenomena like dependence of cation mixing of a given composition as function of temperature, or the existence of vacancies (oxygen or cationic) as function of temperature and oxygen pressure as observed for $LiCoO_2$.

This has not even taken account for further dopants, which might fit into the crystal structure, like Mg, Al, Cr, Ti; such doping introducing further degrees of freedom, adding more dimensions to the already complex thermodynamic system.

Since many years it is known that the layered structure of $LiNiO_2$ can be stabilized, and electrochemical properties can be improved if Ni is replaced by Mn or Co, resulting in $LiNi_{1-x}Mn_xO_2$ and $LiNi_{1-x}CoO_2$. Quite soon it was discovered that Mn and Co can be co-doped, resulting in layered $Li(Ni-Mn-Co)O_2$ phases $LiNi_{1-x-y}Mn_xCo_yO_2$. So JP3244314 (Sanyo) claims $Li_aM_bNi_cCo_dO_e$ covering a wide range of metal compositions.

It was also discovered quite early that Al can replace Ni. So, already in the early and middle nineties there exist many patent with claims like $Li_xNi_{1-a-b}M1_aM2_bO_2$ where generally x is near to unity, M1 is transition metal and M2 a further dopant like aluminum. Examples typically focus on $LiNiO_2$ based materials (say a+b<0.4), and can be found in JP3897387, JP3362583, JP 3653409 or JP3561607, the latter disclosing $Li_aCo_bMn_cM_dNi_{1-(b+c+d)}O_2$ with 0<a<1.2, 0.1<=b<=0.5, 0.05<=c<=0.4, 0.01<=d<=0.4, and 0.15<=b+c+d<=0.5.

It can be summarized that at the mid 90ties prior art were compositions within the Ni rich corner of the solid state solution between $LiCoO_2$—$LiMn_{1/2}Ni_{1/2}O_2$—$\{Li_{1-x}Ni_x\}NiO_2$, including further dopants (like Al). The other corners ($LiCoO_2$, in U.S. Pat. No. 4,302,518, U.S. Pat. No. 4,357,215) and $LiNi_{1/2}Mn_{1/2}O_2$ were also known.

During the 90ties there was put little focus on the Li stoichiometry. So the patents above just claim $LiMO_2$, or a range of Li stoichiometries, but it has generally not been understood that the Li:M ratio is an important variable needing optimization. $Li_1M_1$ was typically seen as a desired stoichiometry which only can be obtained if a small lithium excess is used.

In the late 90ties slowly understanding of the role of excess Lithium evolved. The first document which conclusively shows that additional lithium can be doped into $LiMO_2$ is JP2000-200607, claiming $Li[Co_{1-x}M_x]O_2$ and $Li[Ni_{1-x}M_x]O_2$ where M is at least 2 metals which have an average valence state of 3. Metals M include lithium, Mn, Co, Ni. Not surprisingly, within the next years several more publications regarding lithium rich (=$Li[Li_xM_{1-x}]O_2$) materials were published. To our knowledge, the first disclosure of the possibility of excess lithium, doped into the crystal structure of $LiMO_2$ (M=Mn, Ni, Co) was JP11-307097, claiming $Li_{(1-a)}Ni_{1-b-c-d}Mn_bCo_cM_dO_2$ where −0.15<a<0.1, 0.02<b<0.45, 0<c<0.5 and 0≦d<0.2. The formula of claim 1 $Li_xMO_2$ (if x=1.05 $Li_{1.05}MO_2$) at first glance contradicts today's consent that it be better written as $Li_{1.025}M_{0.975}O_2$, i.e. there is a slight discrepancy between the oxygen stoichiometry, the first formula having a slightly lower (Li+M):O ratio. Both formulas describe the same material, and furthermore, none of them, describes the material completely accurate, simply because any "real" material possibly has a certain number of other disorder parameters like oxygen or cationic vacancies or interstitials, different composition on the surface etc.

Thus <1998 prior art can be defined as all solid solutions within the ternary system $LiNiO_2$—$LiCoO_2$—$LiNi_{1/2}Mn_{1/2}O_2$—$Li[Li_{1/3}Mn_{2/3}]O_2$.

Most of the hundreds of recent publications focus on compositions $Li[Li_xM_{1-x}]O_2$ with M=Mn—Ni—Co, almost exclusively the Ni:Mn ratio is 1, and in many cases the compositions is either M=$Mn_{1/3}Ni_{1/3}Co_{1/3}$ or $(Mn_{1/2}Ni_{1/2})_{1-x}Co_x$ with 0.1<x<0.2. It can be argued that there is a common consent that an excess of lithium (Li:M>1) is desired to obtain high rate capabilities.

Another issue is doping to alter the cathode materials. Above mentioned JP3561607 claims lithium nickel-cobalt-manganese oxide doped with at least 1% of a further dopant, chosen from Al, B, Si, Fe, V, Cr, Cu, Zn, Ga, and W. The patent does not show or explain why these particular dopants were chosen. JP3141858 disclosed fluorine doped cathode materials, whereas JP3355102 discloses doped (Mn, Co, B, Al, P, Mg or Ti) $LiNiO_2$ with a BET surface area of 0.01-0.5 $m^2/g$, containing less than 0.5% $SO_4$.

Another issue is the shape of X-ray diffraction peaks. Sharp peaks with narrow FWHM (full width at half maximum) are related to high crystallinity. JP3653409 (Sanyo) claims a doped $LiNiO_2$ with FWHM of the main peak at 003 of 0.15-0.22 deg of 2 theta, using Cu—K alpha radiations.

JP3301931 (Sanyo) claims a doped (>1%) LiNi—Mn—Co oxide where the main 003 peak (at 18.71±0.25) has a FWHM<0.22 degree.

Despite of the impressive numbers of prior art—it is still not fully clear which compositions within the ternary triangle
LiNiO$_2$—LiCoO$_2$—LiNi$_{1/2}$Mn$_{1/2}$O$_2$—Li[Li$_{1/3}$Mn$_{2/3}$]O$_2$
gives the best performance in terms of capacity and rate performance.

The overall development of cathode materials involves improving parameters which matter in the batteries. Some of the parameters are relatively easy to measure, like capacity, voltage profile and rate performance, which can be measured by making and testing coin cells. Other parameters are less obvious. So it is not fully clear how safety or swelling properties (e.g. of charged polymer batteries during storage at elevated temperature) can be measured, without assembling real batteries. There exists a strong indication that these safety and storage parameters are not only determined by the chemical composition of the cathode but also by surface properties. However, reliable previous art in this area is rare.

In this respect, the authors observed a problem that resides in the reaction of the surface of the active lithium transition metal oxide cathode material and the electrolyte in the battery, leading to poor storage properties and a decreased safety of the battery. The authors argue that lithium located near to the surface thermodynamically is less stable and goes into solution, but lithium in the bulk is thermodynamically stable and cannot go to dissolution. Thus a gradient of Li stability exists, between lower stability at the surface and higher stability in the bulk. By determining the "soluble base" content, based on the ion exchange reaction (LiMO$_2$+δ H$^+$←→Li$_{1-δ}$H$_δ$MO$_2$+δ Li$^+$), the Li gradient can be established. The extent of this reaction is a surface property.

To improve safety, aluminum doping of LiNiO$_2$ based cathodes, as well as Al, Mg—Ti or Ni—Ti doping of LiCoO$_2$ has been frequently disclosed, for example in JP2002-151154 (Al+Co doped LiNiO$_2$) or JP2000-200607 (doped LiCoO$_2$). Typical for doping is that the doped element fits to the host crystal structure, which limits doping of LiMO$_2$ more or less to transition metals, Li, Mg, Ti, Al, and maybe B. Several disclosures show anionic doping, like fluorine doping, phosphor doping or sulfur doping. It is however very questionable if these anions can replace oxygen because they differ in significantly in size or valence. It is more likely that they instead are present at the surface and grain boundaries as lithium salts. The lithium salts LiF, Li$_3$PO$_4$ and Li$_2$SO$_4$ all have high thermal stability which promotes a thermodynamic co-existence with the LiMO$_2$ phase.

In general doping is the modification of the bulk structure, whereas, for safety and storage properties, the surface chemistry is more important. Unfortunately, in many cases, the improvement of surface properties is more than outweighed by the deterioration of bulk properties. Typical examples are the doping by aluminum, where better thermal stability often is accompanied by a dramatic decrease of power (rate performance).

An alternative approach, widely disclosed in the literature is coating. An early disclosure of a coated cathode was KR20010002784, where a LiMO$_2$ cathode (M=Ni$_{1-x}$Co$_x$) (or the sulfur or fluorine "doped" LiMO$_2$ cathode is coated with a metal oxide with metal selected from Al, Al, Mg, Sr, La, Ce, V and Ti and the stoichiometric amount of metal is at least 1%.

An alternative approach is the creation of core-shell cathode materials, or gradient type cathode materials. Here a thick and dense shell of a more robust cathode material protects a core of a more sensitive cathode material. Depending on sintering temperature and chemical composition, the final cathode has either a core-shell morphology or a gradient morphology. Typically both the shell and the core are electrochemically active (have reversible capacity). Examples are found in US2006105239 A1, US2007122705 A1 or US2002192552 A1.

Sulphate is an impurity of concern in layered lithium transition metal oxides. Sulphate typically originates from the mixed hydroxide precursors. This is because the mixed hydroxide preferably is precipitated from transition metal sulphate solution, which is the cheapest water soluble transition metal precursor. Complete removal of sulfur is difficult and increases the cost of the precursor. The sulphate impurity is suspected to cause (a) poor overcharge stability and (b) contribute to the highly undesired low Open Circuit Voltage (OCV) phenomena, where a certain fraction of batteries show a slow deterioration of OCV after initial charge. Sulphate impurities normally measured when using transition metal sulphate solutions in the manufacturing process can be up to 5 wt %.

Finally, manufacturers are frequently confronted with the presence of very fine particles in the cathode materials. This is highly undesired because very fine particles—in the final battery—might electromigrate across the separator, depositing on the anode and causing so-called "soft shorts". These soft short are highly undesired because they might cause field failure of batteries.

It is an object of this invention to develop lithium transition metal oxide cathode materials having improved electrochemical properties, like capacity, voltage profile and rate performance; besides offering solutions to safety and storage problems that are not only determined by the chemical composition of the cathode but also by surface properties. Also the presence of "soft-shorts" can be eliminated.

The invention discloses a powderous lithium transition metal oxide having a layered crystal structure Li$_{1+a}$M$_{1-a}$O$_{2\pm b}$M'$_k$S$_m$ with −0.03<a<0.06, b≅0, M being a transition metal compound, consisting of at least 95% of either one or more elements of the group Ni, Mn, Co and Ti;

M' being present on the surface of the powderous oxide, and consisting of either one or more elements from Group 2, 3, or 4 (IUPAC) of the Periodic Table, each of said Group 2, 3, or 4 elements having an ionic radius between 0.7 and 1.2 Angstrom, M' however not comprising Ti, with 0.015<k<0.15, k being expressed in wt %, and 0.15<m≦0.6, m being expressed in mol %. Preferably 0.25≦m≦0.6.

Preferably also M is consisting of at least 99% of either one or more elements of the group Ni, Mn, Co, Al, Mg and Ti. In one embodiment M' is consisting of either one or more elements of the group Ca, Sr, Y, La, Ce and Zr, with 0.0250<k in wt %.

Preferably M' is Ca, with 0.0250≦k<0.0500, and preferably k≦0.0400.

In another preferred embodiment M=Ni$_x$Mn$_y$Co$_z$ with 0.1≦x≦0.7, 0.1≦y≦0.7, 0.1≦z≦0.7, and x+y+z=1. In a special embodiment 1.0≦x/y≦1.3 and 0.1<z<0.4, and M comprises 10-15 at. % of Ni$^{2+}$, and preferably 11.5-13.5 at. % per total metal Li$_{1+a}$M$_{1-a}$.

For M, most preferred is x=y=z=0.33.

This invention demonstrates that the surface properties, determining the safety and stability of cathodes in real batteries—the surface properties being measured as base content by pH titration—are strongly determined by the sulfur and the content of elements like Ca, Sr, Y, La, Ce and Zr.

At least 150 ppm M' (preferably Ca, Sr, Y, La, Ce and Zr) is needed to achieve the beneficial effect, if the M' addition level is too high (>1500 ppm), the electrochemical properties suffer, particularly the rate performance decreases and the irreversible capacity increases. In a preferred embodiment sulfur levels of 0.15-0.6 mol % can be tolerated if 150-1500 ppm of Ca impurity is present. It was found that 0.15-0.6 mol % of sulfur is harmful to the cathode performance if the Ca doping is lower than 150 ppm.

It is not known and has not been published that Li—Ni—Mn—Co cathode materials, over a wide stoichiometric range, show a better performance if they contain a certain concentration of divalent nickel. There is no prior art that teaches that there exists an optimum Li:M stoichiometric ratio, corresponding to a content of 11.5-13.5% of divalent nickel per metal in the cathode. The actual invention discloses that, surprisingly, the requirement of 11.5-13.5% of divalent nickel relates lithium excess and Ni:Mn ratio in a simple manner. This involves that in some cases, surprisingly, a certain lithium deficiency is preferred.

The invention also covers an electrochemical cell comprising a cathode comprising as active material the powderous lithium transition metal oxide as described above.

The lithium transition metal oxide can be prepared by a cheap process, for example by a single firing of a mixture of a suitable precursor and lithium carbonate in air. Preferably the precursor is a mixed metal precursor like mixed hydroxide, oxyhydroxide or carbonate, already containing adequate amounts of sulfur and calcium. Hence, the invention further covers a method for preparing the powderous lithium transition metal oxide described above, comprising the steps of:

providing for a mixture of M-sulphate, a precipitation agent, preferably NaOH or $Na_2CO_3$, and a complexing agent, hereby precipitating a M-hydroxide, -oxyhydroxide or -carbonate precursor from said mixture having a given sulfur content, aging said precursor whilst adding a base, thereby obtaining a certain base:precursor ratio, followed by washing with water, and drying, mixing said aged M-hydroxide or -oxyhydroxide precursor with a Li precursor, preferably $Li_2CO_3$, sintering said mixture at a temperature T of at least 900° C., and preferably at least 950° C., for a time t between 1 and 48 hrs, thereby obtaining a sintered product; where either:

a salt of M' is added to said M-sulphate containing mixture, or

M' is added to said base during aging, or

M' is added to the water used in said washing step, or a M' salt solution is added to a slurry prepared by suspending said sintered product in water, followed by drying.

Where a salt of M' is added to the M-sulphate containing mixture, this can be to the M-sulphate itself, to the hydroxide (NaOH) or the complexing agent.

In the method, preferably M'=Ca and the salt is either one of $Ca(NO_3)_2$ and $CaCl_2$.

It is preferred that the sulfur content is controlled during the aging step by selecting a given base:precursor ratio.

The actual invention discloses that the application of less than one monolayer of a suitable element, particularly Ca, dramatically changes the surface properties of layered lithium transition metal oxides $Li_{1+x}M_{1-x}O_2$, M=Ni—Mn—Co, with $-0.03<x<0.06$. Calcium is a suitable element but it is very likely that other elements can be added, typical candidates being rare earths and earth alkali metals, as well as Zr, Pb, Sn.

Surface modified cathode materials are prepared in a single step. Precursors can be enriched by e.g. Ca to reach a concentration of 150-1500 ppm. These precursors are used to prepare surface modified LMO by a single cook. If the Ca level of the precursors is lower, then Ca can be added to the precursor, preferably in liquid form, by a technique which the authors call slurry doping. High surface area precursor (for example mixed hydroxide) is dispersed in as little as possible water (or any other solvent) to form a paste of high viscosity. During rigid stirring a dissolved calcium salt like $CaCl_2$ or $Ca(NO_3)_2$ is slowly added until the desired concentration is reached. During addition, and during the following drying, calcium precipitates and is well-dispersed onto the surface of the mixed hydroxide.

Alternatively the calcium can be added during the precursor preparation process. This is possible by adding a small concentration of calcium (typically less than 100 ppm) to the water used to dissolve the metal salt (for example $MSO_4$) precursor or base (NaOH) precursor. Alternatively Ca can be added in higher concentration to the water used to wash the precursor after finished precipitation.

The surface modification by calcium is possibly a catalytic de-activation of active surface sites, because (a) Calcium has a much larger ionic radius and cannot be doped into the bulk structure and (b) up to 1500 ppm Ca is simply not enough to form a coating layer, as shown below. Here the word coating is used in the conventional sense as a layer consisting of at least 10-100 atomic layers, corresponding to a few nm to about 100 nm thickness. The authors speculate that the mechanism of de-activation is related to a phenomenon known from catalyst technology, called catalyst poisoning. During operation of a catalyst (for example platinum in a gas containing traces of sulfur species) trace amounts can de-activate the catalyst by covering catalytically active sites.

The complex layered lithium transition metal oxides are solid state solutions within the ternary system $LiNiO_2$—$LiCoO_2$—$LiNi_{1/2}Mn_{1/2}O_2$—$Li[Li_{1/3}Mn_{2/3}]O_2$ additionally including the possibility of lithium deficient cathodes $\{Li_{1-x}M_x\}MO_2$ and not excluding the possibility of cation mixing

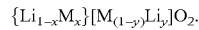

$\{Li_{1-x}M_x\}[M_{(1-y)}Li_y]O_2$.

The authors discovered that the optimum Li:M ratio depends on the metal composition. The authors investigated several metal compositions $M=Ni_{(1-a-b)}Mn_aCo_b$ by measuring the electrochemical performance and base content of test samples as a function of Li:M ratio. Typically "∩" shaped curves (similar as FIG. 2 of Japanese Patent application 10-109746) are obtained. The capacity is typically a relatively flat maximum, deteriorating fast with lower Li:M and more slowly with higher Li:M. The authors discovered that the maximum (=optimum) of these "∩" shaped curves appears at different Li:M ratio's, where the optimum Li:M ratio depends on the metal composition. Particularly, the optimum depends on the Ni composition and the Ni:Mn stoichiometric ratio. The authors discovered that the optimum region is related to the content of divalent nickel as described below:

$M''O_2$ is a layered ordered rock salt compound with $M''=Li_{1+k}M_{1-k}$ where M contains a mixture of manganese, cobalt and nickel, $-0.03<k<0.06$. If $k>0$ then the formula corresponds to a solid state solution of the ternary system $LiNiO_2$—$LiCoO_2$—$LiNi_{1/2}Mn_{1/2}O_2$—$Li[Li_{1/3}Mn_{2/3}]O_2$ and can be rewritten as $Li[Li_{x/3}Mn_{2x/3}Mn_{y/2}Ni_{y/2}Co_zNi_{1-x-y-z}]O_2$. In this formula all Mn is tetravalent, all cobalt is trivalent and the y/2 Ni is divalent whereas the 1−x−y−z Ni is trivalent. If k<0, furthermore assuming that divalent nickel substitutes for lithium sites, the formula can be rewritten as $\{Li_{1-x/3}Ni_{x/3}\}[Mn_{y/2-2x/3}Ni_{y/2-x/3}Co_zNi_{1-x-y-z}]O_2$. In this formula all Mn is tetravalent, all cobalt is trivalent and the y/2 Ni is divalent whereas the 1−x−y−z Ni is trivalent.

The authors observed that the optimum Li:M ratio (=(1+x/3)/(1−x/3)) sensitively depends on the transition metal composition, and corresponding to a quite narrow stoichiometric range of $Ni''$, which again leads to optimized electrochemical properties. It is preferred that the Li:M is chosen so that divalent nickel comprises not less than 10% and not more than 15% of the total metal M" (=Li-M). More preferred, divalent nickel comprises not less than 11.5 and not more than 13.5 at % of the total metal.

This requirement is strictly valid for layered Li-M—$O_2$ within a certain transition metal stoichiometric range. The requirement becomes less accurate if the sample is "high Ni", i.e. $Ni_{1-x-y}Co_xMn_y$ with $1-x-y>0.6$, especially if $y<0.3$. The requirement is also less valid if the sample is "low Ni & low Co", i.e. $Ni_{1-x-y}Co-Mn_y$ with Ni:Mn<1.3 and x<0.2. The requirement of course makes no sense for samples which do not contain enough nickel, i.e. $Ni_{1-x-y}Co_xMn_y$ with $1-x-y<0.2$. In the first case (high Ni) there is a trend that more $Ni^{2+}$ is required to obtain good electrochemical performance. In the latter case (low Ni & Co) there is a trend that less $Ni^{2+}$ is needed. In a medium stoichiometric range $Ni_{1-x-y}Co_xMn_y$ (i.e. with $0.1<x<0.4$ and $1.0<=1-x-y/y<=1.3$) the best electrochemical properties are obtained if the $Ni^{2+}$ comprises between 10-15 at %, more preferred 11.5-13.5 at % of the total M".

The amount of base which goes to dissolution (soluble base content) is directly related to the surface properties of the cathode. Since surface properties of the cathode dominate the stability (i.e. safety and overcharge/high T storage properties of the real battery) there will be a correlation between base content and stability. The present invention shows that there is a surprising correlation between base content and Ca content (ppm range) and sulfur content (0.1% range). Certainly, to obtain highly stable cathodes, the optimization of the Ca and sulfur content is important.

The amount of base dissolving is a function of BET surface area, composition of the bulk and dopants, particularly Ca, on the surface. Somehow Ca stabilizes the lithium in the surface region and causes less lithium to dissolve. The increased stability of lithium on the surface causes beneficial properties of the cathode in the battery, like improved storage properties and better safety.

Sulfur also contributes to the amount of specific base (base per surface). The authors believe that this is mostly due to a closure of pores of Li-M-oxide by sulfur salts, which cause low BET surface areas to be measured. In the presence of sulfur the "real surface area" of the Li-M-Oxide is much larger, then measured by BET, so the base content increases. Therefore the present invention teaches, that if sulfur is present, then also elements like Ca must be present to effectively lower the base content to an acceptable level.

The invention is further explained by the following Examples and Figures. The Figures are summarized as follows:

FIG. 1: Correlation of Ca concentration and soluble base content

Figure 2:
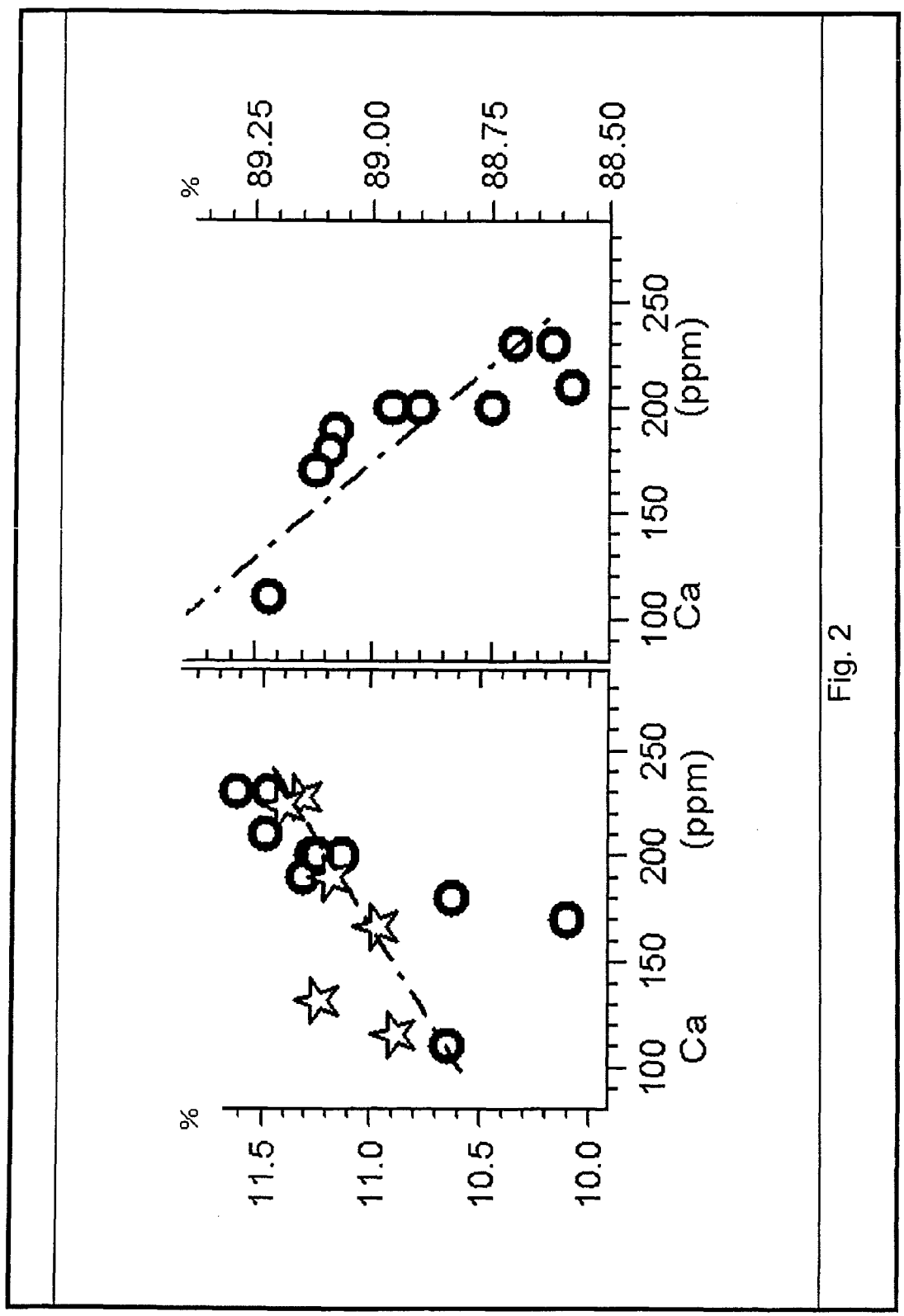

FIG. 2: Correlation of Ca concentration and irreversible capacity and rate performance FIG. 3: Correlation of Ca and S concentration with soluble base content FIG. 4: Correlation of Ca and S concentration with first cycle discharge capacity FIG. 5: Settling down kinetics of Ca treated $LiMO_2$ FIG. 6: Settling down kinetics of Ca free versus Ca treated $LiMO_2$

EXAMPLE 1

Improved Safety and Lower Base Content of Ca Containing Cathode 2 cathode materials MP1 and MP2 with composition $Li_{1+a}M_{1-a}O_{2\pm b}Ca_kS_m$ were produced at large scale (several tons) from mixed transition metal hydroxide, which contained different amounts of Ca and sulfur. In both cases the stoichiometry was very similar (a=0.05, M=$Mn_{1/3}Ni_{1/3}Co_{1/3}$, m≅0.4 mol %) but the level of Ca was different: MP1 had 393 ppm Ca, whereas MP2 had a normal impurity level of 120 ppm Ca (normally more than 50 but less than 150 ppm is found in non-doped cathode material). Other properties (lithium stoichiometry, particle size, BET surface area, X-ray diffraction pattern) were basically similar.

The content of soluble base was measured as follows: 100 ml of de-ionized water is added to 7.5 g of cathode, followed by stirring for 8 minutes. Settling-down is allowed for typically 3 minutes, then the solution is removed and passed through a 1 μm syringe filter, thereby achieving >90 g of a clear solution which contains the soluble base.

The content of soluble base is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau is $OH^-/H_2O$ followed by $CO_3^{2-}/HCO_3^-$, the lower plateau is $HCO_3^-/H_2CO_3$. The inflection point between the first and second plateau as well as the inflection point after the second plateau is obtained from the corresponding minima of the derivative d pH/d Vol of the pH profile. The second inflection point generally is near to pH 4.7. Results are listed as micromole of base per g of cathode.

The amount of base which goes into solution is very reproducible, and is directly related to surface properties of the cathode. Since these have a significant influence on the stability (i.e. safety and overcharge/high T storage properties of the final battery) there is a correlation between base content and stability.

Table 1A and 1B summarize the results:

TABLE 1A

Properties of sample MP1 and MP2

| Sample | Li % wt | Ni % wt | Mn % wt | Ca ppm | S % wt | Co % wt | PSD (μm) D10 | PSD (μm) D50 | PSD (μm) D90 | TapD g/cm³ | BET m²/g |
|---|---|---|---|---|---|---|---|---|---|---|---|
| MP1 | 7.568 | 19.573 | 18.625 | 393 | 0.087 | 19.441 | 4.3 | 6.9 | 10.8 | 2.07 | 0.42 |
| MP2 | 7.523 | 19.733 | 18.439 | 120 | 0.148 | 19.707 | 3.7 | 6.4 | 10.5 | 2.09 | 0.44 |

TapD: tap density; 0.087 and 0.148 wt % S corresponds to approx. 0.3 and 0.5 mol % S.

TABLE 1B

Properties of sample MP1 and MP2

| Sample | Unit cell (X-ray) | | | Soluble Base µmol/g | Qrev 4.3-3.0 V mAh/g | Qirr % | Rate versus 0.1 C % | | | Safety Over charge |
|---|---|---|---|---|---|---|---|---|---|---|
| | a (Å) | c (Å) | Vol, Å³ | | | | 3 C | 2 C | 3 C | |
| MP1 | 2.8590 | 14.2327 | 33.584 | 25.9 | 155.0 | 11.8 | 86.0 | 89.1 | 86.0 | Pass |
| MP2 | 2.8594 | 14.2337 | 33.595 | 51.2 | 156.3 | 10.9 | 86.6 | 89.1 | 86.6 | Fail |

The samples are very similar, with one exception: the soluble base content of sample MP1 (with high Ca) was significantly lower than for MP2. Other properties are very similar, and although MP2 (with low Ca) shows slightly higher capacity, slightly lower irreversible capacity and slightly higher rate performance, the results for MP1 are still acceptable. More important, the samples MP1 and MP2 were sent to battery producer for safety testing. Whereas MP1 passed the safety test, MP2 did not pass.

The "Safety overcharge test" used here is a safety test where a battery is charged at a very high rate (for example with 1C charge rate) until a much higher voltage than the normal operating voltage (for example 20V) is reached. In many cases during such a test more lithium is extracted from the cathode than can be inserted to the anode, so the dangerous effect of lithium plating occurs. At the same time the highly delithiated cathode is in a highly reactive state, and ohmic (resistive) heat is generated. The heat can initiate the dramatic thermal run-away reaction, ultimately leading to the explosion of the battery. If a battery passes such a test (i.e. does not explode) or not is strongly dependent on the choice of cathode material, its morphology, impurity levels and its surface chemistry. Very little fundamental scientific understanding exists, but the presence of fine particles definitively contributes to poor safety. (see also below)

Conclusion: the higher content of Ca caused lower soluble base content and higher safety.

Example 1 showed that a Ca content of approx. 250-400 ppm effectively lowered the base content and improved the safety of the cathode. If we now estimate the number of atomic layers on top of the surface of the cathode, assuming that a) all of the calcium is located at the surface of the cathode particles,
b) the surface area of the cathode is reliably obtained by 5 point BET measurement using nitrogen,
c) Calcium is evenly distributed on the surface,
d) the average distance between Ca atoms is the same as in CaO;

then it can be concluded that the effect of Ca is rather a catalytic effect (less than a few one atomic layer) and not caused by a conventional coating effect (many layers of atoms). This is shown in

EXAMPLE 2

Calculation of the "Thickness" of the Ca Surface Layer

The estimation, based on the data of Example 1, goes as follows:

CaO has an fcc crystal structure with 4.8108 Å lattice constant; thus nearest neighbors form tetrahedrons with 3.401 Å side length. Thus a one-atom monolayer of Ca (having a hexagonal 2-dim lattice with 3.401 Å lattice constant) corresponds to a density of 0.664 mg/m². The cathode material MP1 (MP2) of Example 1 has a BET area of 0.42 m²/g (0.44 m²/g). A monolayer covering this BET area corresponds to 280 ppm (292 ppm) Ca.

Therefore sample MP1 has a surface coverage of approx. 1.4 monolayers and MP2 has a coverage of only 0.41 monolayer of calcium. This is much thinner than conventional coating.

It can be concluded that the observed effect of calcium is not a protection by a coating layer but rather a catalytic effect (de-activation of active surface sites)

EXAMPLE 3

Theoretical Background: Base Content/Ca Chemistry

It might be argued that a possible dissolution of Ca somehow interferes with the solubility of lithium or base, thus causing the observation of lower base content for samples with higher Ca. This argumentation is wrong.

First, Lithium compounds have higher solubility than corresponding Calcium compounds. Secondly, this example shows that the amount of Calcium is negligible, thus it cannot change the solubility of Li or base during the pH titration measurement.

We use samples MP1 and MP2 of Example 1 to make the following estimations:

25.9 µmol of base per g of cathode are titrated for sample MP1
51.2 µmol are titrated for the lower Ca sample MP2.
Thus the content of soluble base differs by 25.2 µmol/g.
MP1 has 393 ppm Ca, MP2 has 120 ppm Ca. This is a difference of Ca content of 271 ppm.
The molar weight of Ca is 40.1 g/mol.
A simple calculation yields that the difference in Calcium is 271/40.1=6.76 µmol/g.
We conclude that an increase of Ca by only 6.76 µmol/g causes a much larger decrease of base by 25.2 µmol. The large decrease can only be explained if we accept that Ca stabilizes the surface so that less Li goes into solution.

EXAMPLE 4

Base Content as a Function of Ca Content—Different Precursors

Example 1 demonstrated that the low Ca sample MP2 had higher base content than high Ca sample MP1. This is confirmed in Example 4 by detecting a good correlation between lower base content and higher Ca content for a larger series of samples with similar morphology and composition (Li, Mn, Co, Ni, S).

Ten transition metal hydroxide precursors from a mass production batch were received, denominated MOOH1-10. The hydroxides have a metal composition of $M=Ni_{1/3}Mn_{1/3}Co_{1/3}$. Ten samples—lithium transition metal oxide samples S1a-S10a (each approx. 250 g)—were prepared with a Li:M=1.1 blend ratio (according chemical analysis of the precursor) at a temperature of 960° C. in air. The lithium content was checked (by comparing the unit cell volume) and the BET surface area was measured. All samples had a very similar morphology (particle size distribution, tap density, particle shape, SEM micrographs, crystallite size).

The Ca content of all precursors was obtained by chemical analysis. The content of Ca in the final product is the same as in the precursor. The crucibles do not contain Ca, evaporation is not observed, and Ca practically does not diffuse into the crucible. The soluble base content of the Li-M-oxide samples was measured by pH titration.

Tables 2A and FIG. 1 summarize the results.

example confirms that a small amount of Ca dramatically decreases the amount of soluble base, without much deteriorating the electrochemical performance: a slight increase of irreversible capacity and a slight deterioration of rate performance are observed. As expected, the normal impurity level of Ca (<150 ppm) gives the worst results for base content. FIG. 2 summarizes the measured electrochemical properties as function of calcium content, taken from Tables 2A and B (indicated by bullets ○). The left figure plots the irreversible capacity (%) vs. Ca content, the right figure the rate performance at 2C (%) vs. Ca content. Data for irreversible capacity of some further samples (mass production samples) were added to the Figure as stars (☆).

In practice it is worth to accept the slight deterioration of rate performance if this allows to dramatically lower the base content, thus achieving improved high temperature stability and safety of real cells.

EXAMPLE 5

Soluble Base Content and Electrochemical Performance as a Function of Effective S—Ca Content Most samples of Example 4 had a similar level of sulfur. Example 5 will show that the content of Ca and the content of

TABLE 2A

Properties of samples S1a-S10a prepared from transition metal hydroxide precursors.

| Precursor | Sample | Ca ppm | $SO_4$ wt % | a (Å) | c (Å) | Vol, Å$^3$ | BET m$^2$/g | Base μmol/g |
|---|---|---|---|---|---|---|---|---|
| MOOH1 | S1a | 170 | 0.489 | 2.8597 | 14.2353 | 33.605 | 0.43 | 77.0 |
| MOOH2 | S2a | 180 | 0.441 | 2.8599 | 14.2353 | 33.610 | 0.42 | 78.1 |
| MOOH3 | S3a | 150 | 0.456 | 2.8602 | 14.2363 | 33.620 | 0.41 | 83.4 |
| MOOH4 | S4a | 130 | 0.465 | 2.8597 | 14.2348 | 33.604 | 0.41 | 85.9 |
| MOOH5 | S5a | 65 | 0.489 | 2.8595 | 14.2338 | 33.599 | 0.4 | 99.2 |
| MOOH6 | S6a | 190 | 0.486 | 2.8599 | 14.2353 | 33.610 | 0.43 | 74.7 |
| MOOH7 | S7a | 170 | 0.51 | 2.8594 | 14.2341 | 33.596 | 0.42 | 82.9 |
| MOOH8 | S8a | 200 | 0.525 | 2.8596 | 14.2357 | 33.605 | 0.42 | 78.1 |
| MOOH9 | S9a | 190 | 0.319 | 2.8595 | 14.2347 | 33.600 | 0.37 | 88.4 |
| MOOH10 | S10a | 200 | 0.525 | 2.8595 | 14.2344 | 33.599 | 0.38 | 85.0 |

Then a second series of test samples S1b-S10b (each approx. 700 g) was prepared. The temperature and Li:M blend ratio was corrected slightly to achieve samples with a more narrow distribution of BET and identical final Li:M ratio. Table 2B and FIG. 1 summarize the results. It contains the data of Table 2A (A: bullets ○) and data of some further samples (mass production samples), indicated as stars (B: ☆)

sulfur completely determines the soluble base content as well as other properties (electrochemically performance) for a larger series of mass scale production samples (>500 kg sample size). The samples had the same composition (Li, Mn, Ni, Co) but differed in Ca and Sulfur content.

Data analysis showed that Ca has a negative regression coefficient versus the soluble base content, whereas the $SO_4$

TABLE 2B

Properties of samples S1b-S10b prepared from transition metal hydroxide precursors

| Sample | Ca ppm | $SO_4$ wt % | a (Å) | c (Å) | Vol, Å$^3$ | BET m$^2$/g | Base μmol/g | Qrev 4.3-3.0 V mAh/g | Qirr % | Rate versus 0.1 C % 1 C | 2 C | 3 C |
|---|---|---|---|---|---|---|---|---|---|---|---|---|
| S1b | 200 | 0.500 | 2.8597 | 14.2331 | 33.601 | 0.42 | 29.5 | 156.5 | 11.3 | 92.3 | 88.9 | 86.7 |
| S2b | 190 | 0.440 | 2.8599 | 14.2320 | 33.603 | 0.37 | 30.6 | 157.4 | 13.5 | 92.4 | 89.1 | 86.9 |
| S3b | 180 | 0.460 | 2.8598 | 14.2317 | 33.600 | 0.39 | 33.1 | 156.8 | 10.6 | 92.6 | 89.1 | 86.3 |
| S4b | 170 | 0.480 | 2.8597 | 14.2322 | 33.599 | 0.39 | 32.3 | 157.4 | 10.1 | 92.6 | 89.1 | 86.9 |
| S5b | 110 | 0.500 | 2.8599 | 14.2310 | 33.601 | 0.42 | 36.0 | 155.6 | 10.6 | 92.7 | 89.2 | 86.9 |
| S6b | 200 | 0.500 | 2.8592 | 14.2319 | 33.586 | 0.42 | 31.0 | 156.6 | 11.1 | 92.5 | 89.0 | 86.7 |
| S7b | 200 | 0.530 | 2.8601 | 14.2333 | 33.611 | 0.39 | 28.8 | 155.2 | 11.2 | 92.4 | 88.7 | 86.2 |
| S8b | 210 | 0.530 | 2.8595 | 14.2322 | 33.594 | 0.40 | 27.6 | 154.9 | 11.5 | 92.5 | 88.6 | 85.0 |
| S9b | 230 | 0.580 | 2.8595 | 14.2329 | 33.596 | 0.37 | 28.5 | 155.5 | 11.6 | 92.4 | 88.6 | 85.3 |
| S10b | 230 | 0.560 | 2.8593 | 14.2331 | 33.591 | 0.35 | 30.5 | 155.3 | 11.5 | 92.47 | 88.70 | 85.34 |

Apparently, there exists a clear correlation between increasing Ca content and lower soluble base content. The content has a positive regression coefficient. This allowed to define a statistical variable k being the "effective S—Ca"

content by k=0.84*S—Ca where S and Ca are the ppm results of the ICP analysis for S and Ca. The formula can be interpreted as the statistical proof that a higher content of sulfur can be neutralized by addition of Ca.

Figure 3:
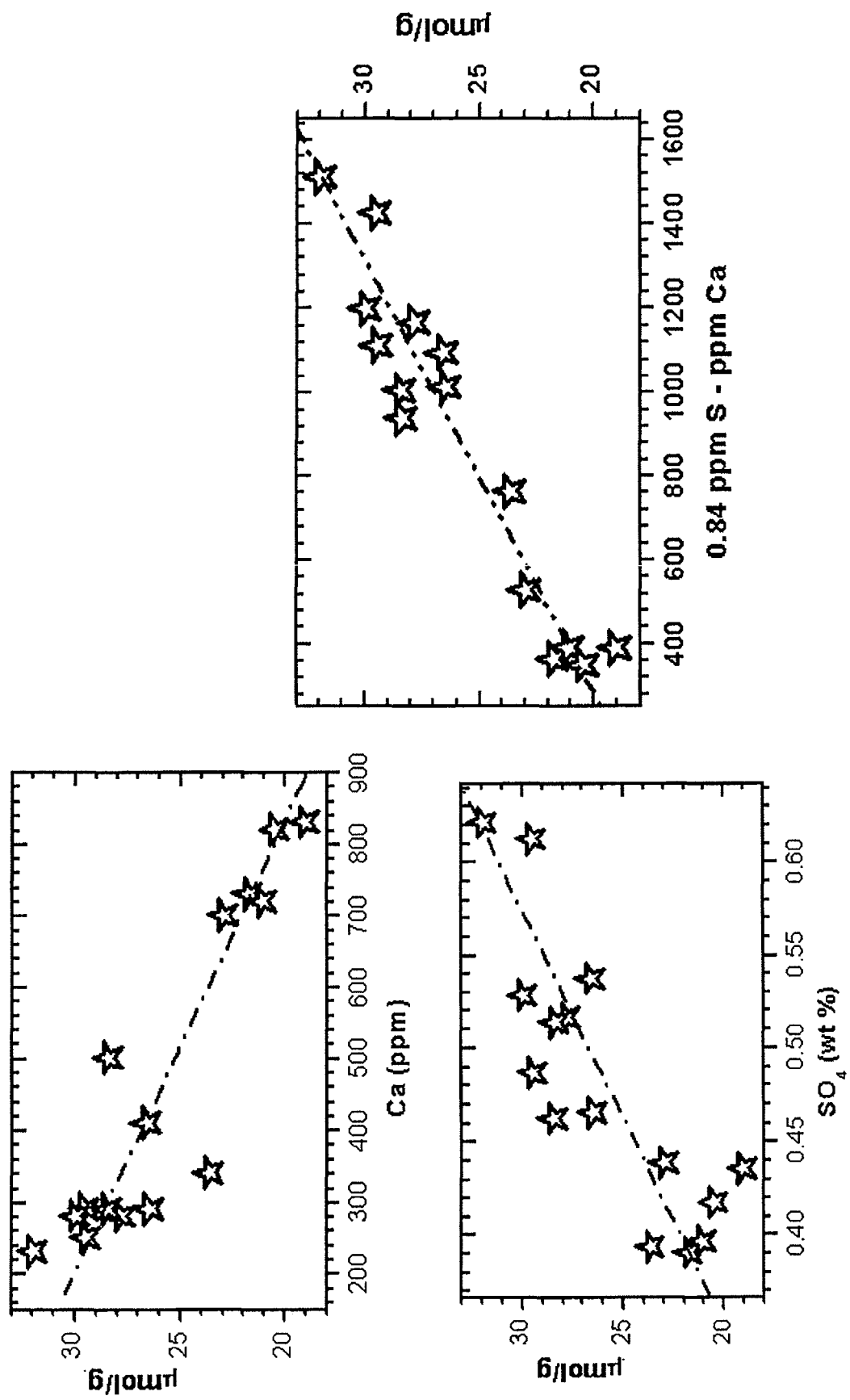

FIG. 3 shows that there is a very good correlation between effective S—Ca content and soluble base content. Both Ca and Sulfur correlate reasonable well with base content. The top left figure gives the soluble base content (μmol/g) vs. Ca content, the bottom left figure gives the same against the $SO_4$ content. A statistical variable k (a linear combination of 0.84*S (ppm)–Ca (ppm)) shows an almost perfect positive correlation. The correlation coefficient is +0.95. This is shown on the right figure.

Figure 4:
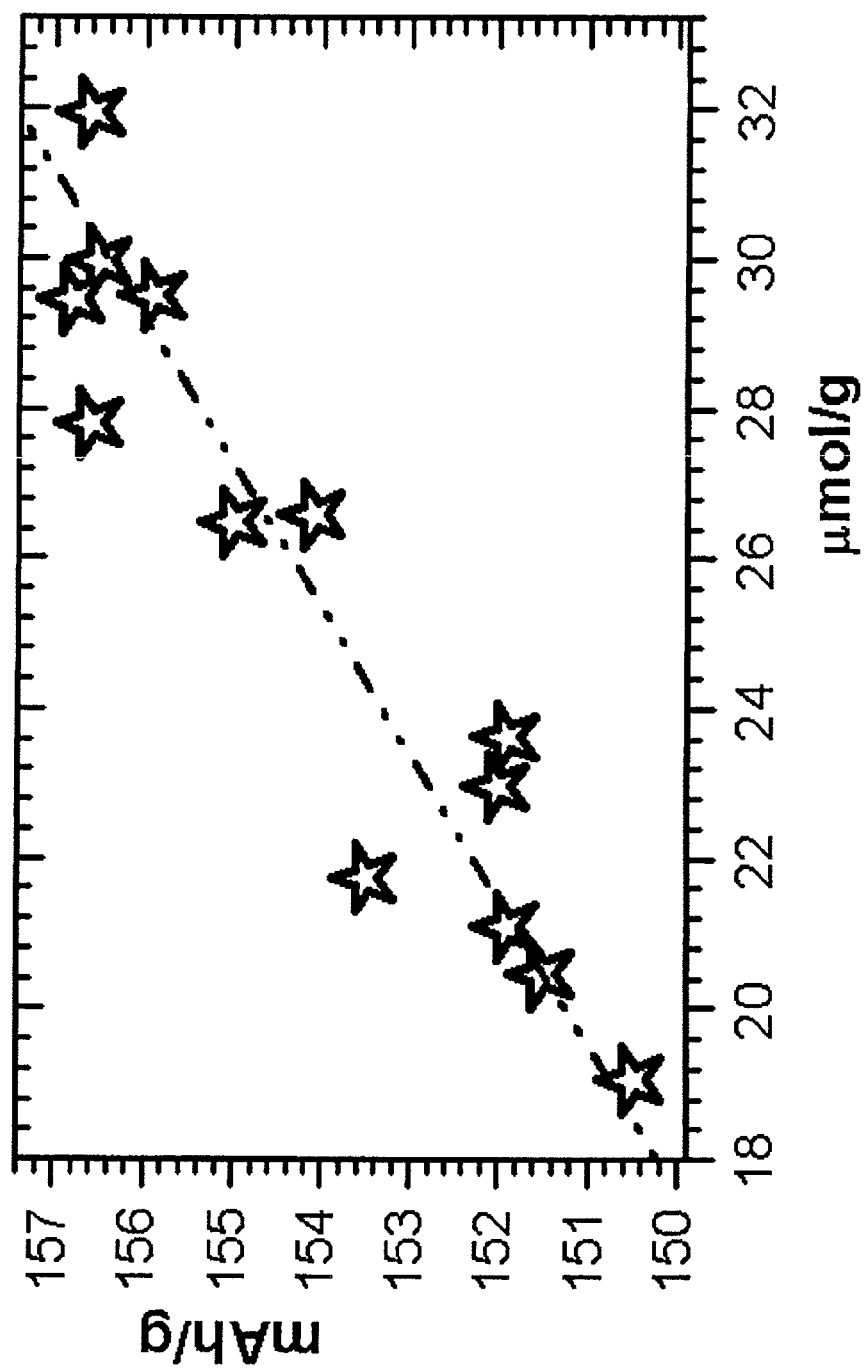

Surprisingly, there is also a very good correlation between soluble base content (μmol/g) and electrochemical performance, as shown in FIG. 4. Here the electrochemical performance is given by the discharge capacity of the first cycle ($1^{st}$ cycle DC Q—in mAh/g). The correlation factor is 0.94.

FIG. 3 and FIG. 4 are important examples showing the need to control very well the Ca level and S levels. Note that the base content varies by almost 100%, and the discharge capacity by 5%, these are comparably huge numbers considering that the Ca content varies by less than 600 ppm and the sulfur content by about 0.25 mol %

EXAMPLE 6

Optimization of Ca and Sulfur Additions

This Example serves to demonstrate 2 aspects of the invention:
(1) it confirms the observation of Example 5 that Ca "neutralizes" the negative effect of a high soluble base content of sulfur containing cathodes, and
(2) it demonstrates that only samples which contain both sulfur and calcium according to the invention show good overall performance.

The Example uses a mixed transition metal hydroxide precursor with metal composition $M=Mn_{1/3}Ni_{1/3}Co_{1/3}$. The precursors naturally are low in Ca but contain some sulfur. The sulfur is removed after preparation of a preliminary Li-M-Oxide sample (Li:M=1.1) by washing. Then the preliminary sample is used as precursor, and the following material matrix is prepared:
(6a): no addition of sulfur or calcium
(6b): addition of 400 ppm Ca
(6c): addition of 0.5 wt % $SO_4$
(6d): addition of both 400 ppm Ca and 0.5 wt % $SO_4$, This is followed by a re-sintering. Final samples with the same morphology but different Ca, S composition are obtained. The addition of Ca and S is performed by slurry doping of the Li-M-oxide preliminary sample (also described below in example 7). Slurry doping is the drop-wise addition of a $Li_2SO_4$ solution or of a $Ca(NO_3)_2$ solution during stirring of a preliminary sample powder-in-water slurry of high viscosity, followed by drying in air. A total of 400 ppm Ca and/or 5000 ppm ($SO_4$) sulfur was added. Note that 1000 ppm of sulfate generally corresponds to approx. 0.1 mol % of sulfur, more accurate—for $Li_{1.04}M_{0.96}O_2$ 1000 ppm correspond to 0.105 mol %.

The experiment was repeated for a precursor with $M=Ni_{0.53}Mn_{0.27}Co_{0.2}$ composition, where the preliminary sample—the precursor during slurry doping—was prepared using a Li:M=1.02 blend ratio. The conclusions of Example 5 (neutralization of sulfur by Ca) are confirmed: if the sample contains sulfur, the addition of Ca neutralizes the high soluble base content caused by the sulfur.

Electrochemical properties are tested, and settling down kinetics is measured (see also Example 8 for more details). The sample without added Ca showed the highly undesired fine particles which do not settle down. All samples with Ca settled down very fast. Of all samples—only the sample which contains Ca and sulfur show overall good performances, as can be seen in Tables 3A and 3B.

Samples situated outside the claimed concentrations (either too high or too low) show the following disadvantages:
Low Ca & low SO4→unacceptable level of fine particles
Low Ca and high SO4→high soluble base content, fine particles
High Ca and low SO4→relatively poor electrochemical performances.
(see also below Table 4A)

TABLE 3A

Slurry doped $LiMn_{1/3}Ni_{1/3}Co_{1/3}O_2$

| Slurry doping: Li—M—$O_2$ $M = Mn_{1/3}Ni_{1/3}Co_{1/3}$ Addition of | BET $m^2$/g | Ca ppm | $SO_4$ (wt %) | Base μmol/g | Q DC 3.0-4.3 V mAh/g | Qirr (%) | Rate @ 2C (%) |
|---|---|---|---|---|---|---|---|
| (6a) Nothing | 0.41 | 150 | 0.180 | 26.9 | 157.5 | 10.95 | 89.08 |
| (6b) 400 ppm Ca | 0.41 | 500 | 0.182 | 20.8 | 156.3 | 11.53 | 88.24 |
| (6c) 0.5 wt % $SO_4$ | 0.44 | 150 | 0.620 | 31.0 | 157.8 | 10.65 | 88.84 |
| (6d) 400 ppm Ca, 0.5 wt % $SO_4$ | 0.45 | 510 | 0.630 | 23.3 | 156.4 | 11.02 | 88.80 |

TABLE 3B

Slurry doped $LiNi_{0.53}Mn_{0.27}Co_{0.2}O_2$

| Slurry doping: Li—M—$O_2$ $M = Ni_{0.53}Mn_{0.27}Co_{0.2}$ Addition of | BET $m^2$/g | Ca ppm | $SO_4$ (wt %) | Base μmol/g | Q DC 3.0-4.3 V mAh/g | Qirr (%) | Rate @ 2C (%) |
|---|---|---|---|---|---|---|---|
| (6a) Nothing | 0.3 | 120 | 0.095 | 37.8 | 169.1 | 12.76 | 87.10 |
| (6b) 400 ppm Ca | 0.32 | 430 | 0.087 | 27.0 | 166.6 | 13.79 | 86.83 |
| (6c) 0.5 wt % $SO_4$ | 0.36 | 110 | 0.25 | 58.1 | 169.6 | 11.84 | 87.39 |
| (6d) 400 ppm Ca, 0.5 wt % $SO_4$ | 0.33 | 440 | 0.28 | 49.4 | 168.1 | 12.75 | 87.82 |

Note that in this test (3B) some of the added $SO_4$ was lost due to crystallization.

EXAMPLE 7

Comparing Ca and Mg with Same Precursor Material

This example shows data of different samples prepared from one single hydroxide precursor, with varying Ca concentration by addition of different amounts of Ca to the precursor during preparation. As reference Mg was added to confirm the role of Ca. A hydroxide with low content of Ca (60 ppm) was received. The transition metal composition was approx. $Ni_{0.37}Co_{0.32}Mn_{0.31}$. Sulfur content was approx. 0.4 wt % $SO_4$. The hydroxide was divided into smaller samples (each approx. 500 g). A water-based slurry of high viscosity was prepared from each sample. The water used to slurry the precursor contained appropriate additions of dissolved $CaCl_2$. The slurry was continuously stirred. Thus a Ca doped slurry was achieved which was dried in a convection oven without filtering, resulting in a Ca treated mixed hydroxide. In the same way Mg doped (dissolved $Mg(NO_3)_2$ was added to the water) and Mg+Ca doped mixed hydroxide was prepared from the same precursor.

Six samples (CaAdd1-CaAdd6) were prepared from the Ca doped mixed hydroxide by mixing with $Li_2CO_3$, the Li:M blend ratio was 1.07, followed by a heating at 960° C.

Table 4 gives an overview of the prepared samples. The Ca concentration of the undoped sample is slightly higher than expected (120 ppm), possibly caused by a slight Ca dissolution from the baker used during the slurry preparation. The table shows that (a) the content of base decreases with increasing content of Ca and (b) the addition of Mg does not alter the base content at all, (c) the BET surface area decreases with increasing calcium content. (c) indicates that the sintering kinetics speeds up with higher Ca (or Cl contamination) content.

The base content decreases by 33%, whereas the BET area only decreases by 18%, proving that part of the decreased base content is caused by a different surface chemistry, and not, as could be assumed, by a decrease of the surface area itself. Note that the reduction of base is slightly less than expected, possibly caused by a less than perfect dispersion of Ca on the surface of the precursor during slurry doping.

Table 4 also shows that the magnesium does not influence the base content at all. The base content however depends on the Ca content, independently of how much Mg is added. The soluble base decreases with increasing calcium level. It is believed that the ionic radius of Mg is too small (0.66 Angstrom) compared to Ca (0.99 Angstrom), the latter having a size that fits very well to the surface of Li-M-oxide—see Example 11 below.

EXAMPLE 8

Ca Level and Fine Particles

As said above, the presence of very fine particles is highly undesired because very fine particles—in the final battery—might electromigrate across the separator, depositing on the anode and causing so-called "soft shorts", leading to field failure of batteries. These particles are normally finer than 1 µm. It is believed that the decrease of these fine particles is responsible for better safety.

Example 8 shows that the addition of Calcium eliminates fine particles, although the mechanism causing this beneficial effect is not fully understood by the authors.

The samples CaAdd1, CaAdd2, CaAdd3 and CaAdd4 (of Example 7) were investigated in a settling experiment. After disposing a cathode material in water it is desired that the particles settle down fast, and that a clear solution remains on top. A slow settling indicates the presence of fine particles.

Figure 5:
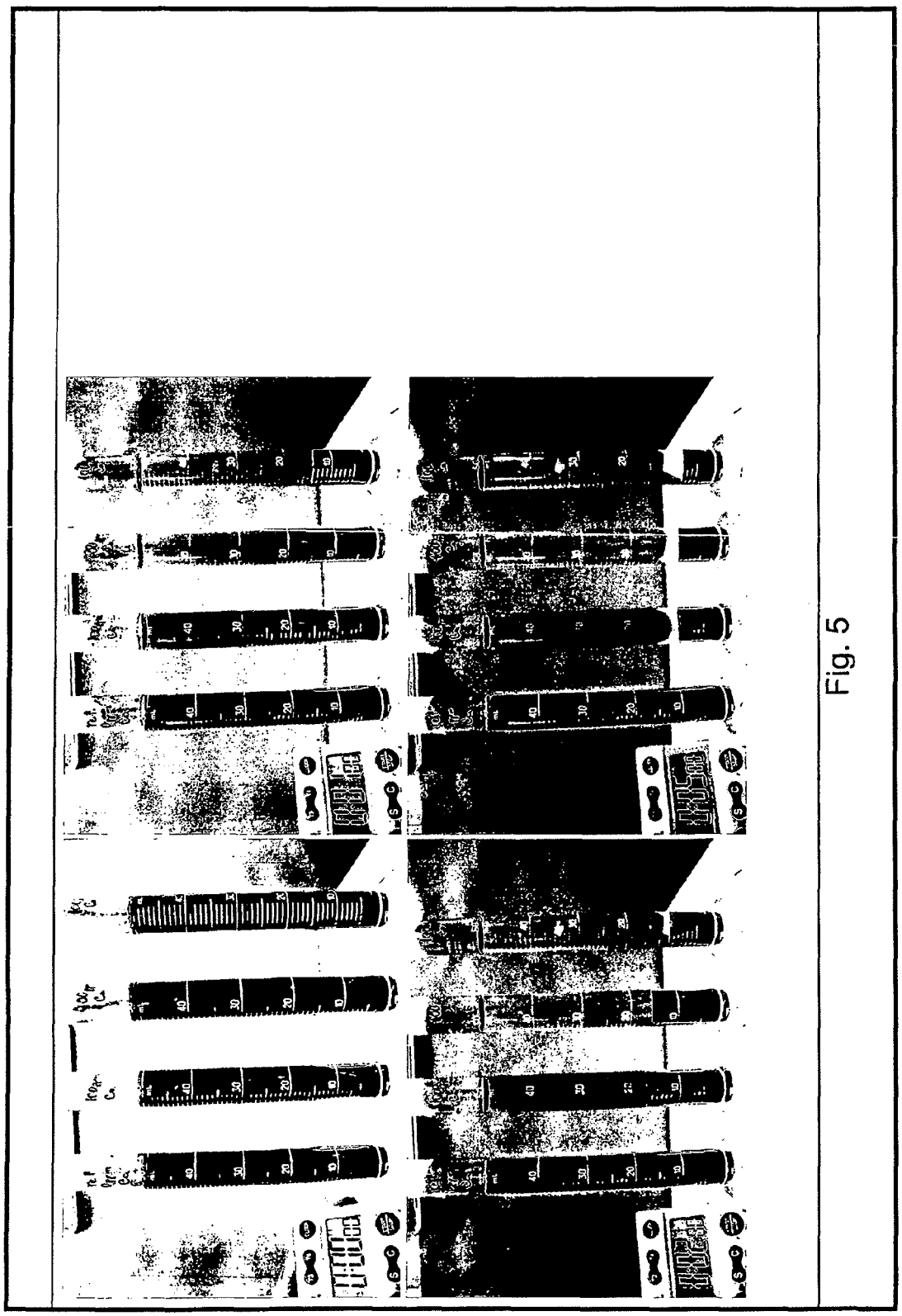

FIG. 5 shows photographs of a settling down experiment. Ca content: from left to right: (1) 120 ppm (2) 190 ppm, (3) 420 ppm, (4) 900 ppm. After a settling time of 1 minute of 5 g of suspended particles in a 50 ml measuring (graduated) cylinder, the height of the separation line between clear solution and the particle suspension layer was situated at (1) 50, (2) 30, (3) 22, and (4) 13 ml, after 5 min: (1) 49, (2) 11, (3) 9, and (4) 8 ml. Obviously, an increase of Ca impurity causes a dramatic increase of settling kinetics—proving that Ca addition eliminates the presence of fine particles.

As a result of Examples 4 to 8 the following Table 4A gives an overview of the addition of Ca and S.

TABLE 4A

Overview

|  | Low Sulfur | Sulfur: 0.15-0.6 mol % | High Sulfur |
|---|---|---|---|
| Low Calcium | too many fine particles | high soluble base content - too many fine particles | very high soluble base content - too many fine particles |
| Calcium: 150-1500 ppm | poor electrochemical properties | good electrochemical properties - low soluble base content | high soluble base content |
| High Calcium | very poor electrochemical properties | poor electrochemical properties | poor electrochemical properties |

TABLE 4

Properties of samples prepared from a single MOOH modified by adding Ca and/or Mg

| Sample | Ca added ppm | Mg added ppm | Ca ppm | BET m²/g | Base µmol/g | Qrev 4.3-3.0 V mAh/g | Qirr % | Rate versus 0.1 C % 1 C | 2 C | 3 C |
|---|---|---|---|---|---|---|---|---|---|---|
| CaAdd1 | 0 | 0 | 120 | 0.66 | 67.9 | 158.5 | 11.5 | 90.8 | 86.7 | 83.7 |
| CaAdd2 | 100 | 0 | 190 | 0.64 | 63.1 | 157.9 | 11.8 | 90.9 | 86.7 | 83.7 |
| CaAdd3 | 400 | 0 | 420 | 0.57 | 50.8 | 156.1 | 12.8 | 90.9 | 87.8 | 85.0 |
| CaAdd4 | 1000 | 0 | 900 | 0.54 | 43.5 | 155.1 | 12.9 | 91.1 | 87.0 | 84.0 |
| CaAdd5 | 400 | 300 | 0 |  | 51.7 |  |  |  |  |  |
| CaAdd6 | 0 | 300 | 0 |  | 67.6 |  |  |  |  |  |

EXAMPLE 9

Soluble Base Content is a Thermodynamic Materials Property

This example discusses that the base content is a thermodynamic equilibrium materials property. It can be changed by well-designing the calcium and sulfur content. It can, however not be changed by altering the preparation conditions after being sufficiently equilibrated.

A few kg of the mass production sample MP2 of Example 1 (having a "natural" Ca content of 120 ppm) is used to investigate if the soluble base content can be lowered, depending on heating temperature, air flow, or washing in water followed by reheating. For the washing—the amount of water is limited, and the Li lost is monitored. This figure is negligible, consisting of approx. 0.1% of the total Li in the sample. Reheating temperatures are lower than the initial sintering temperature, thus the morphology does not change during reheating.

The soluble base content of the initially received sample can be slightly lowered by a heat treatment (equilibration), indicating that the lithiation of the MP2 sample is not 100% completed. However, after reheating, independently of heating conditions, the same soluble base content is always achieved. This base content is the equilibrium content, depending of surface area, metal composition and Ca and sulfur level. Washing removes a large fraction of Sulfur—as soluble $Li_2SO_4$—but does not remove Ca (this was checked by ICP), resulting in a low Sulfur-low Ca sample. The low sulfur-low calcium sample has a lower soluble base content. After washing, already at low drying temperature (150° C.) the same equilibrium value is re-established which is achieved after washing and reheating at 750° C. All these observations are summarized in Table 5.

TABLE 5

| Sample | Re-heating treatment | Airflow during re-heating | Base µmol/g |
|---|---|---|---|
| MP2 | As received | | 51.0 |
| MP2A | Heated to 600° C., 5 h | yes | 45.5 |
| MP2B | Heated to 750° C., 5 h | Yes | 45.4 |
| MP2C | Heated to 750° C., 5 h | No | 46.5 |
| MP2G | Heated to 750° C., 5 h extremely low bed-depth | Yes | 46.0 |
| MP2E | Washed, dried at 150° C. | Yes | 25.8 |
| MP2F | Washed, dried at 150°, heated to 750° C. | Yes | 27.3 |

EXAMPLE 10

Comparison of Identical Morphology with High/Low Ca Content

A sample EX10A (1 kg size) is prepared from a mass scale production precursor mixed hydroxide with metal composition $Mn_{1/3}Ni_{1/3}Co_{1/3}$ by mixing the precursor with $Li_2CO_3$ (blend ratio 1.1) followed by heating to 960° C. EX10B is prepared in the same way, with the exception that the precursor was modified by the previously described slurry doping: a total of 400 ppm Ca was slowly (drop wise) added in the form of $Ca(NO_3)_2$ to a water based slurry of the precursor, followed by drying (no filtering).

Table 6A and 6B summarize the results

TABLE 6A

| Sample | Ca ppm | BET m²/g | PSD D10 | PSD D50 | PSD D90 | a hex Å | c hex Å | Vol Å³ | size nm |
|---|---|---|---|---|---|---|---|---|---|
| EX10A | 140 | 0.43 | 3.79 | 5.925 | 9.08 | 2.8590 | 14.2259 | 33.567 | 281 |
| EX10B | 420 | 0.42 | 3.78 | 5.914 | 9.07 | 2.8593 | 14.2316 | 33.588 | 254 |

TABLE 6B

| | Qrev 4.3-3.0 V | | Rate versus 0.1 C (%) | | | |
|---|---|---|---|---|---|---|
| Sample | mAh/g | Qirr % | 1 C | 2 C | 3 C | Base µmol/g |
| EX10A | 154.9 | 10.39 | 92.85 | 89.14 | 85.33 | 39.6 |
| EX10B | 153.8 | 11.71 | 92.61 | 88.99 | 86.05 | 26.5 |

As Tables 6A and 6B show, besides of the Ca impurity level, all 3 samples are, as expected for samples prepared under similar conditions from the same precursor, very similar. The PSD, obtained by laser diffraction are identical. Similar as observed in previous examples—the sample with Ca addition shows the smallest content of soluble base.

Figure 6:
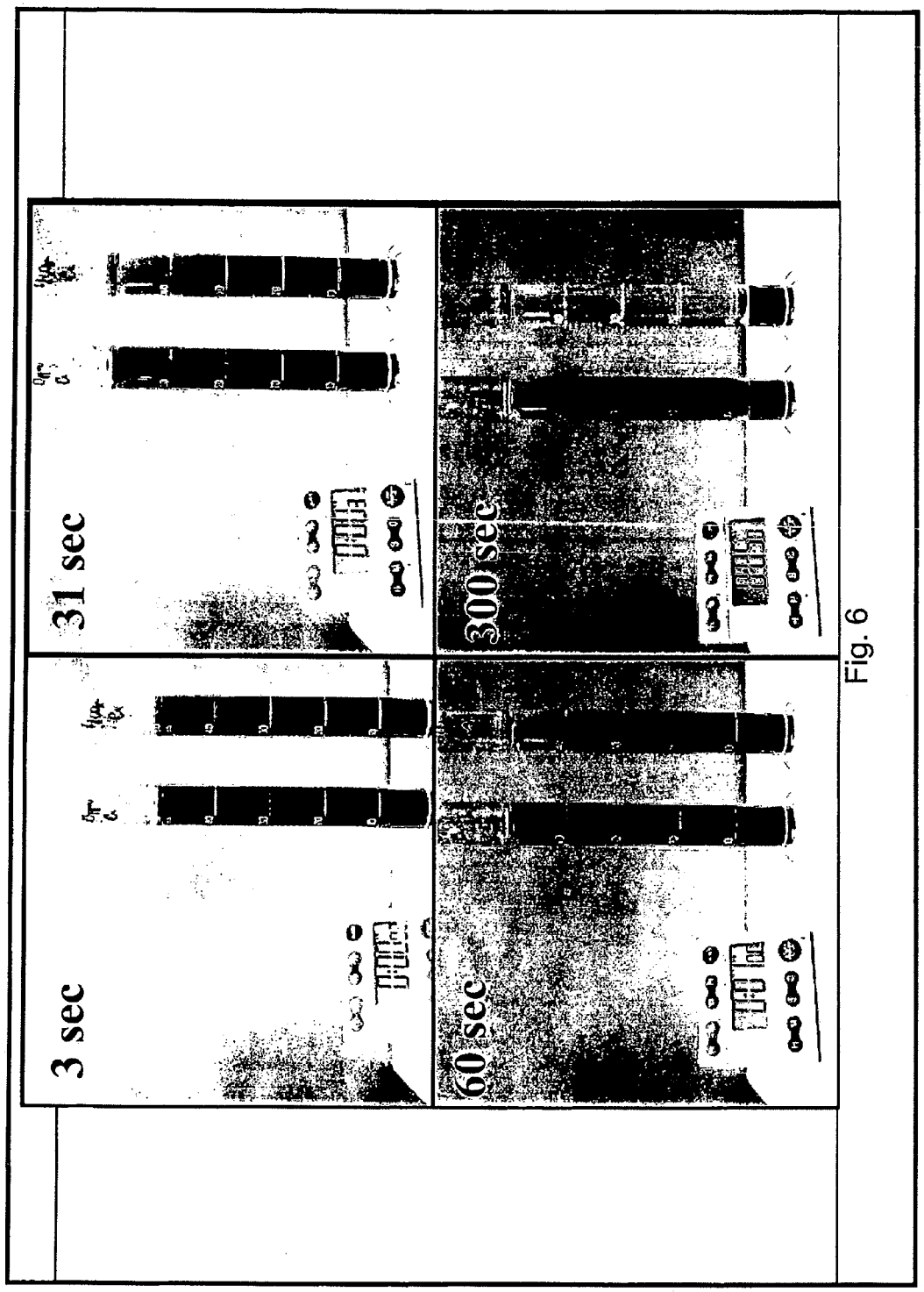

Despite that the particle size distribution of sample EX10A and EX10C is identical—the settling down kinetics after dispersing the cathode in water is dramatically different. FIG. 6 shows photographs of a settling down experiment of Ca treated LiMO2: Addition of Ca: (1: left) 0 ppm, (2: right) 400 ppm: after a settling time of 1 minute of 5 g of suspended particles in a 50 ml measuring (graduated) cylinder, the height of the separation line between "clear" solution and the particle suspension layer was situated at (1) 27, (2) 18 ml, only after 5 min the suspended particles in both cylinders have nearly all settled down. Obviously, an increase of Ca impurity causes a dramatic decrease of fine particles—as a result Ca rich cathodes settle down much faster.

EXAMPLE 11

Alternative Elements Besides Ca

This example uses a mixed transition metal hydroxide precursor with metal composition $M1=Mn_{0.33}Ni_{0.38}CO_{0.29}$ as precursor. The precursor is low in Ca but, as expected, contains some sulfur. A similar experiment is done with a mixed hydroxide precursor with $M2=Ni_{0.53}Ni_{0.27}Co_{0.2}$ composition.

The precursors are doped by slurry doping: 1000 ppm of nitrate solutions of Ca, Y, Sr, La, Ba, Fe are added, respectively. A reference was slurry doped but no metal was added. After slurry doping the precursors were mixed with $Li_2CO_3$ and cooked. Besides of the doping, final composition (Li, Mn, Ni, Co) was very similar.

To compare the efficiency to lower the base content the following parameters are considered:
(a) Soluble base content (=soluble base/mass of cathode)
(b) Specific surface base (=soluble base content/surface area of cathode)
(c) Molar efficiency of dopant (µmol) versus gravimetric efficiency of dopant (ppm)

The results are summarized in Tables 7A (M1) and 7B (M2) below.

TABLE 7A

Efficiency of Ca, Y, Ba, Sr, La for Li—M-oxide with M = $Mn_{0.33}Ni_{0.38}Co_{0.29}$

| $Mn_{0.33}Ni_{0.38}Co_{0.29}$ | Slurry doping by | BET $m^2/g$ | Base µmol/g | Spec Surf Base µmol/$m^2$ | Rel % spec base | Unit cell X ray |
|---|---|---|---|---|---|---|
| LNMnCD0548 | Ref. 0 ppm | 0.52 | 51.3 | 98.7 | 100.0 | 33.702 |
| LNMnCD0549 | Ba, 1000 ppm | 0.45 | 44.1 | 98.0 | 99.3 | 33.705 |
| LNMnCD0550 | Ca, 1000 ppm | 0.50 | 30.5 | 61.0 | 61.8 | 33.718 |
| LNMnCD0551 | La, 1000 ppm | 0.54 | 50.5 | 93.5 | 94.8 | 33.703 |
| LNMnCD0552 | Sr, 1000 ppm | 0.42 | 35.1 | 83.6 | 84.7 | 33.713 |
| LNMnCD0553 | Y, 1000 ppm | 0.54 | 41.8 | 77.4 | 78.5 | 33.713 |

TABLE 7B

Comparison of the efficiency of Ca, Y, Ba, Sr, La for Li—M-oxide with M = $Ni_{0.53}Ni_{0.27}Co_{0.2}$

| $Ni_{0.53}Mn_{0.27}Co_{0.2}$ | Slurry doping by | BET $m^2/g$ | Base µmol/g | Spec Surf Base µmol/$m^2$ | Rel % spec base | Unit cell X ray |
|---|---|---|---|---|---|---|
| MLMOx0132 | Ref. 0 ppm | 0.38 | 74.7 | 196.6 | 100.0 | 33.889 |
| MLMOx0127 | Ca, 1000 ppm | 0.34 | 51.0 | 150.0 | 76.3 | 33.880 |
| MLMOx0128 | Sr, 1000 ppm | 0.27 | 47.9 | 177.4 | 90.2 | 33.869 |
| MLMOx0129 | Ba, 1000 ppm | 0.32 | 64.1 | 200.3 | 101.9 | 33.861 |
| MLMOx0130 | La, 1000 ppm | 0.37 | 70.4 | 190.3 | 96.8 | 33.862 |
| MLMOx0131 | Y, 1000 ppm | 0.38 | 64.5 | 169.7 | 86.3 | 33.874 |

The conclusions are as follows:

(a) Base content: Sr and Ca, and to a lesser degree Y and Ba are most efficient to lower the soluble base content.

(b) The final samples have different BET area, hence the "Specific Surface Base Content" is observed: Ca, Sr and Y, and to a lesser degree La lower the specific surface base content of the cathode.

(c) Gravimetric efficiency: Sr and Ca are the most efficient. Molar efficiency: Considering the high molecular weight of Y (more than twice that of Ca) we conclude that both Ca and Y are most efficient to neutralize high base caused by sulfur. Sr is somewhat less effective and La shows noticeable, but small efficiency. Ba is not effective, as can be seen in the "Specific Surface Base Content". Fe is inert (not reported).

The authors speculate that the effective elements have an ionic radius of 0.7 to 1.2 Angstrom. Especially Ca and Y—which have almost similar and quite small ionic radius (in 6 coordination Ca: 0.99, Y: 0.893 Å)—have a size that fits very well to the surface of Li-M-oxide. The more preferred range for ionic radii is 0.85-1.15 Angstrom.

EXAMPLE 12

Strontium Versus Calcium

Example 11 compared the efficiency of Ca, Sr, La, Ba, Y to lower the content of soluble base.

However, Example 11 did not take into account that the sintering kinetics change with different additives—yielding very different BET values. Example 12 compares the effect of Ca and Sr more carefully.

A reference without addition of additive (Ca or Sr) was prepared from a mixture of mixed transition metal hydroxide (M=$Ni_{0.38}Mn_{0.33}Co_{0.28}$) and $Li_2Co_3$ at 980° C. Further samples with addition of 400 and 1000 ppm Sr and 400 ppm Ca were prepared. Each sample used 1 kg of MOOH+ $Li_2CO_3$. The additive (Ca, Sr) was added by the previously described "slurry doping" process. Appropriate amounts of solution of $Sr(NO_3)_2$ and $Ca(NO_3)_2$ were added to a high viscous slurry of the precursor hydroxide during rigid stirring.

The sintering temperature was adjusted to achieve a similar sintering. Base content was measured, unit cell volume and crystallite size was obtained from X-ray diffraction and electrochemical properties were tested by coin cells. Table 8A and 8B summarizes the preparation conditions results

TABLE 8A

Preparation and morphology of samples with Sr, Ca addition

| Li—M-oxide, $Ni_{0.38}Mn_{0.33}Co_{0.28}$ | Slurry doping by | BET $m^2/g$ | ICP Ca, Sr ppm | Base µmol/g | Vol Å$^3$ | Size nm | D5 µm | D50 µm | D95 µm |
|---|---|---|---|---|---|---|---|---|---|
| LNMnCD0555 | Reference | 0.50 | <100 | ≅50 | 33.7348 | 336 | | | |
| MLMOx0149 | Sr, 400 ppm | 0.52 | 349 | 42.9 | 33.6910 | 332 | 5.14 | 8.99 | 15.3 |
| MLMOx0150 | Sr, 1000 ppm | 0.50 | 832 | 37.6 | 33.6891 | 320 | 5.13 | 8.97 | 15.2 |
| MLMOx0151 | Ca, 400 ppm | 0.49 | 425 | 34.3 | 33.6078 | 319 | 5.14 | 8.98 | 15.3 |

TABLE 8B

Electrochemical performance (capacity, irreversible capacity and rate (versus 0.1 C) of samples with Sr, Ca addition

| $Ni_{0.38}Mn_{0.33}CO_{0.28}$ | Q rev 4.3-3.0 V | Q irr % | 1 C % | 2 C % | 3 C % |
|---|---|---|---|---|---|
| LNMnCD0555 | 161.9 | 11.1 | 91.8 | 88.4 | 85.1 |
| MLMOx0149 | 161.5 | 11.3 | 92.7 | 89.1 | 86.4 |
| MLMOx0150 | 159.8 | 11.8 | 92.4 | 88.7 | 85.8 |
| MLMOx0151 | 159.3 | 12.1 | 92.2 | 88.4 | 85.5 |

The morphology (BET, particle size) of all samples was basically identical. Ca addition is most effective to lower the base content. 1000 ppm Sr reduces the base content about the same, but less than for 400 ppm Ca. However, Sr is interesting because it reduces the base and at the same time the electrochemical properties deteriorate less than for 400 ppm Ca addition.

EXAMPLE 13

What is the Optimum Li—Mn—Ni—Co Composition?

So far, this invention demonstrated that the surface properties, determining the safety and stability of cathodes in real batteries—the surface properties being measured as base content by pH titration—are strongly determined by the sulfur and Ca (amongst others) content. The authors also analyzed large amounts of data to understand what else determines the base content. The analysis shows clearly that the base content furthermore depends on BET surface area of Li-M-$O_2$, it also varies strong with Li:M ratio and Ni:Mn ratio.

The base content increases linearly with BET, it increases with increasing Li:M ratio and with increasing Ni:Mn ratio. Table 9 shows a typical example for Li-M-oxide where M contains 33% Co.

TABLE 9

Base content as function of Ni:Mn ratio and Li:M ratio for samples prepared at different temperature

| Sinter T | Li:M blend ratio | Base content (µmol/g) | | | | Spec. Base content (µmol/m²) | | | |
|---|---|---|---|---|---|---|---|---|---|
| | | Ni:Mn 0.95 | Ni:Mn 1.05 | Ni:Mn 1.2 | Ni:Mn 1.3 | Ni:Mn 0.95 | Ni:Mn 1.05 | Ni:Mn 1.2 | Ni:Mn 1.3 |
| 930 | 1.05 | 20.0 | 43.8 | 71.5 | 76.6 | 37.8 | 59.2 | 96.6 | 111.0 |
| | 1.15 | 65.1 | 88.0 | 115.5 | 121.8 | 135.5 | 127.5 | 172.4 | 213.6 |
| 960 | 1.0 | 13.3 | 23.0 | 53.1 | 58.6 | 28.9 | 35.4 | 80.5 | 93.0 |
| | 1.05 | 20.5 | 42.7 | 71.2 | 77.4 | 50.0 | 62.8 | 111.3 | 126.9 |
| | 1.1 | 42.6 | 60.6 | 89.1 | 89.4 | 109.2 | 116.5 | 174.7 | 194.3 |
| | 1.15 | 60.7 | 81.8 | 104.2 | 106.1 | 151.8 | 146.1 | 221.7 | 235.8 |
| 990 | 1.05 | 22.2 | 42.0 | 67.0 | 69.8 | 63.4 | 85.7 | 148.9 | 166.2 |
| | 1.15 | 55.1 | 67.0 | 88.5 | 90.6 | 166.8 | 163.4 | 252.7 | 323.5 |

The authors intended to optimize the BET and Li:M as well as Ni:Mn composition in order to achieve the optimum of high electrochemical performance, but keeping base content low. It was shown that a similar electrochemical performance can be achieved by high BET but lower Li:M, or lower BET and higher Li:M. By trying to optimize the composition, BET and crystallinity—it was recognized that within the region of interest only samples with a certain content of divalent Ni, high crystallinity allows to achieve overall optimized cathodes.

Table 10 below lists the preferred upper and lower Li:M stoichiometric range for Li-M-$O_2$ with different transition metal composition. The columns in the table refer to the following formulas $$Li_{1+k}M_{1-k}O_2 \text{ with } Ni_{1-a-b}Mn_aCo_b \text{ and (b) } Li[Li_{x/3}Mn_{2x/3}Ni_{y/2}Mn_{2/y}Co_zNi_{1-x-y-z}]O_2 \text{ as follows:} \quad (a)$$

Ni, Mn, Co are the mol fractions 1-a-b, a, b in the transition metal M

"Ni:Mn" is the molar ratio of Ni to Mn (=(1-a-b)/a) in the transition metal M

"Li:M" is the molar ratio of Li:M (=(1+k)/(1-k)=(1+x/3)/(1-x/3)

The column "$Ni^{2+}$" gives twice the fraction of divalent nickel (=2*y/4).

TABLE 10

Preferred upper and lower Li:M stoichiometric range for Li—M—$O_2$ with different transition metal composition.

| Li/M (1 + k)/ (1 − k) | Ni/Mn (1 − a − b)/a | M | | | $Ni^{2+}$ y/2 |
|---|---|---|---|---|---|
| | | Ni(1 − a − b) | Mn(a) | Co(b) | |
| 1.028 | 1.00 | 0.3333 | 0.3333 | 0.3333 | 0.3011 |
| 1.055 | | | | | 0.2709 |
| 1.092 | | | | | 0.2307 |
| 1.121 | | | | | 0.2002 |
| 1.036 | 0.95 | 0.3248 | 0.3419 | 0.3333 | 0.3005 |
| 1.063 | | | | | 0.2704 |
| 1.100 | | | | | 0.2304 |
| 1.128 | | | | | 0.2010 |
| 1.021 | 1.05 | 0.3415 | 0.3252 | 0.3333 | 0.3010 |
| 1.048 | | | | | 0.2707 |
| 1.085 | | | | | 0.2304 |
| 1.113 | | | | | 0.2009 |
| 1.002 | 1.20 | 0.3636 | 0.3030 | 0.3333 | 0.3007 |
| 1.029 | | | | | 0.2701 |
| 1.065 | | | | | 0.2305 |
| 1.093 | | | | | 0.2007 |
| 0.991 | 1.30 | 0.3768 | 0.2899 | 0.3333 | 0.3002 |
| 1.017 | | | | | 0.2706 |

TABLE 10-continued

Preferred upper and lower Li:M stoichiometric range for Li—M—$O_2$ with different transition metal composition.

| Li/M (1 + k)/ (1 − k) | Ni/Mn (1 − a − b)/a | M | | | $Ni^{2+}$ y/2 |
|---|---|---|---|---|---|
| | | Ni(1 − a − b) | Mn(a) | Co(b) | |
| 1.053 | | | | | 0.2307 |
| 1.081 | | | | | 0.2007 |

An analysis of the data reveals:

(1) It is difficult to obtain a good overall performance if Ni:Mn=1. Ni:Mn>1 allows for better electrochemical performance.

(2) The optimum Li:M stoichiometric region depends on the transition metal composition.

The optimum Li:M is achieved if the cathode $Li_{1+a}M_{1-a}O_2$ contains 11.5-13.5% of divalent nickel per 2 mol metal (Li+M).

The optimum Li:M decreases with increasing Ni:M.

(a) Ni:Mn=0.95: Li:M=1.07
(b) Ni:Mn=1.05: Li:M=1.06
(c) Ni:Mn=1.2: Li:M=1.05
(d) Ni:Mn=1.3: Li:M=1.04

Similar experiments were repeated for different metal compositions, including $M=Mn_{0.45}Ni_{0.45}Co_{0.1}$, $M=Ni_{0.67}Mn_{0.22}Co_{0.11}$, $M=Ni_{0.53}Mn_{0.26}Co_{0.2}$, $M=Ni_{0.5}Mn_{0.3}Co_{0.2}$, $M=Ni_{0.55}Mn_{0.3}Co_{0.15}$, $M=Mn_{0.4}Ni_{0.5}Co_{0.1}$. $Mn_{0.33}Ni_{0.39}Co_{0.28}$, $Mn_{0.33}Ni_{0.37}Co_{0.3}$.

The invention claimed is:

1. A powderous lithium transition metal oxide having a layered crystal structure $Li_{1+a}M_{1-a}O_{2\pm b}M'_k S_m$ with $-0.03<a<0.06$, $b\approx 0$, M being a transition metal compound, consisting of at least 95% of either one or more elements of the group Ni, Mn, Co and Ti; wherein the powderous lithium transition metal oxide is a solid state solution and wherein M' is present on the surface of the powderous oxide and consists of either one or more elements selected from the group consisting of Ca, Sr, Y, La, Ce and Zr, with $0.0250<k\leq 0.1$ in wt %; and $0.15<m\leq 0.6$, m being expressed in mol %.

2. The powderous lithium transition metal oxide of claim 1, wherein M consists of at least 99% of one or more elements selected from the group consisting of Ni, Mn, Co, Al, Mg and Ti.

3. The powderous lithium transition metal oxide of claim 1, wherein M' is Ca, with $0.0250\leq k<0.0500$, in wt %.

4. The powderous lithium transition metal oxide of claim 1, wherein $0.25\leq m\leq 0.6$, in mol %.

5. The powderous lithium transition metal oxide of claim 1, wherein $M=Ni_x Mn_y Co_z$ with $0.1\leq x\leq 0.7$, $0.1\leq y\leq 0.7$, $0.1\leq z\leq 0.7$, and $x+y+z=1$.

6. The powderous lithium transition metal oxide of claim 5, wherein $1.0\leq x/y\leq 1.3$ and $0.1<z<0.4$, and comprising 10-15 wt. % of $Ni^{2+}$ per total metal $Li_{1+a}M_{1-a}$.

7. The powderous lithium transition metal oxide of claim 6, comprising 11.5-13.5 wt. % $Ni^{2+}$ per total metal $Li_{1+a}M_{1-a}$.

8. The powderous lithium transition metal oxide of claim 6, wherein $x=y=z=0.33$.

9. An electrochemical cell comprising a cathode, wherein the cathode comprises as active material the powderous lithium transition metal oxide of claim 1.

10. A method for preparing the powderous lithium transition metal oxide of claim 1, comprising:

providing a first mixture of M-sulphate, a precipitation agent and a complexing agent, thereby precipitating a M-hydroxide, -oxyhydroxide or -carbonate precursor from said first mixture having a given sulfur content, aging said precursor whilst adding a base, thereby obtaining a certain base:

precursor ratio, followed by washing with water, and drying, mixing said aged precursor with a Li precursor to form a second mixture, sintering said second mixture at a temperature T of at least 900° C., for a time t between 1 and 48 hours, thereby obtaining a sintered product;

wherein either:

a salt of M' is added to said M-sulphate containing mixture, or

M' is added to said base during aging, or

M' is added to the water used in said washing step, or a M' salt solution is added to a slurry prepared by suspending said sintered product in water, followed by drying.

11. The method for preparing a powderous lithium transition metal oxide of claim 10, wherein M'=Ca and said salt is either one of $Ca(NO_3)_2$ or $CaCl_2$.

12. The method for preparing the powderous lithium transition metal oxide of claim 10, wherein said given sulfur content is controlled during said aging step by selecting a given base: precursor ratio.

13. The method of claim 10, wherein the precipitating agent is NaOH or $NaCO_3$.

14. The method of claim 10, wherein T is at least 950° C.

* * * * *